United States Patent
Chen et al.

(10) Patent No.: US 7,636,143 B2
(45) Date of Patent: Dec. 22, 2009

(54) IN-PLANE SWITCHING MODE LIQUID CRYSTAL DISPLAY PANEL WITH SLITTED COMMON ELECTRODES

(75) Inventors: Hung-Yu Chen, Miao-Li (TW); Tsau-Hua Hsieh, Miao-Li (TW)

(73) Assignee: Innolux Display Corp., Miao-Li County (TW)

( * ) Notice: Subject to any disclaimer, the term of this patent is extended or adjusted under 35 U.S.C. 154(b) by 354 days.

(21) Appl. No.: 11/511,142

(22) Filed: Aug. 28, 2006

(65) Prior Publication Data

US 2007/0046882 A1    Mar. 1, 2007

(30) Foreign Application Priority Data

Aug. 26, 2005    (TW) .............................. 94129258 A (51) Int. Cl.
*G02F 1/1343* (2006.01)
(52) U.S. Cl. ......................... 349/141; 349/139
(58) Field of Classification Search ................. 349/141, 349/139
See application file for complete search history.

(56) References Cited

U.S. PATENT DOCUMENTS

| | | | |
|---|---|---|---|
| 6,486,933 B1 * | 11/2002 | Cha et al. ................... | 349/139 |
| 6,989,884 B2 * | 1/2006 | Te-Cheng .................... | 349/192 |
| 2003/0107696 A1 * | 6/2003 | Song ........................... | 349/141 |
| 2004/0212761 A1 * | 10/2004 | Kadotani et al. ............. | 349/110 |
| 2005/0174521 A1 * | 8/2005 | Nishida et al. .............. | 349/141 |

* cited by examiner

*Primary Examiner*—Michael H Caley
*Assistant Examiner*—Charles Chang
(74) *Attorney, Agent, or Firm*—Wei Te Chung (57) ABSTRACT

An exemplary in-plane switching mode liquid crystal display (IPS-LCD) panel (100) includes a thin film transistors (TFT) substrate (120), a color filter (CF) substrate (110) facing the TFT substrate, a liquid crystal layer (130) sandwiched between the two substrates. The TFT substrate includes a plurality of gate lines and source bus lines (121, 122) defining pixel regions. Each of the pixel regions includes a pair of source bus lines, a pixel electrode (125) therebetween and parallel to the source bus lines, a pair of shield metal lines (123) located at two opposite sides of the pixel electrode, a pair of common electrodes (126) that are parallel to the pixel electrode and partly overlap the shield metal lines respectively. Each of the common electrodes includes a slit (1261) therein in order to attenuate any crosstalk between the source bus line and the pixel electrode.

3 Claims, 6 Drawing Sheets

IN-PLANE SWITCHING MODE LIQUID CRYSTAL DISPLAY PANEL WITH SLITTED COMMON ELECTRODES

FIELD OF THE INVENTION

The present invention relates to an in-plane switching mode liquid crystal display (IPS-LCD) panel, which has common electrodes configured to reduce crosstalk.

GENERAL BACKGROUND

Because IPS-LCD devices have the advantages of portability, wide viewing angle, low power consumption, and low radiation, they have been widely used in various portable information products such as notebooks, personal digital assistants (PDAs), video cameras, and the like. Furthermore, LCD devices in general are considered by many to have the potential to completely replace CRT (cathode ray tube) monitors and televisions.

Figure 9:
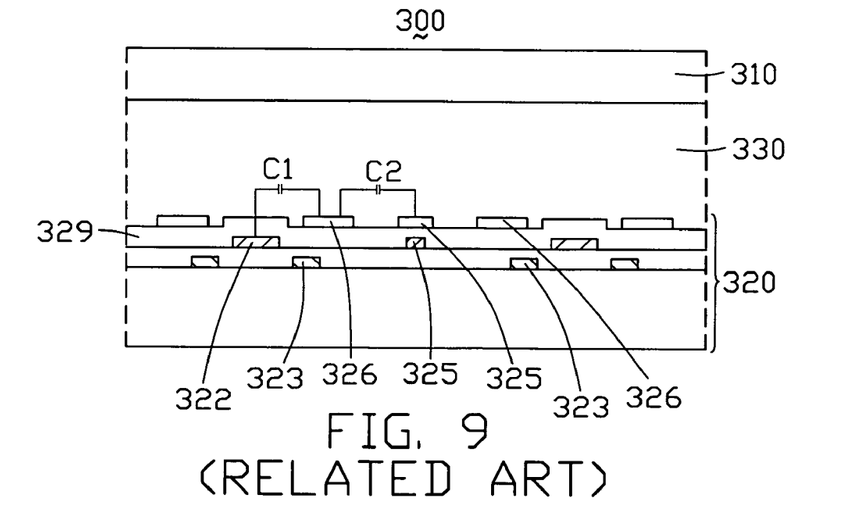
FIG. 9 is a cross-sectional view of one of the pixel units of the conventional IPS-LCD, corresponding to line IX-IX of FIG. 8.

Referring to FIG. 9, a typical IPS-LCD panel 300 includes a color filter (CF) substrate 310, a thin film transistor (TFT) substrate 320 facing the CF substrate 310, and a liquid crystal layer 330 sandwiched between the two substrates 310, 320.

Figure 7:
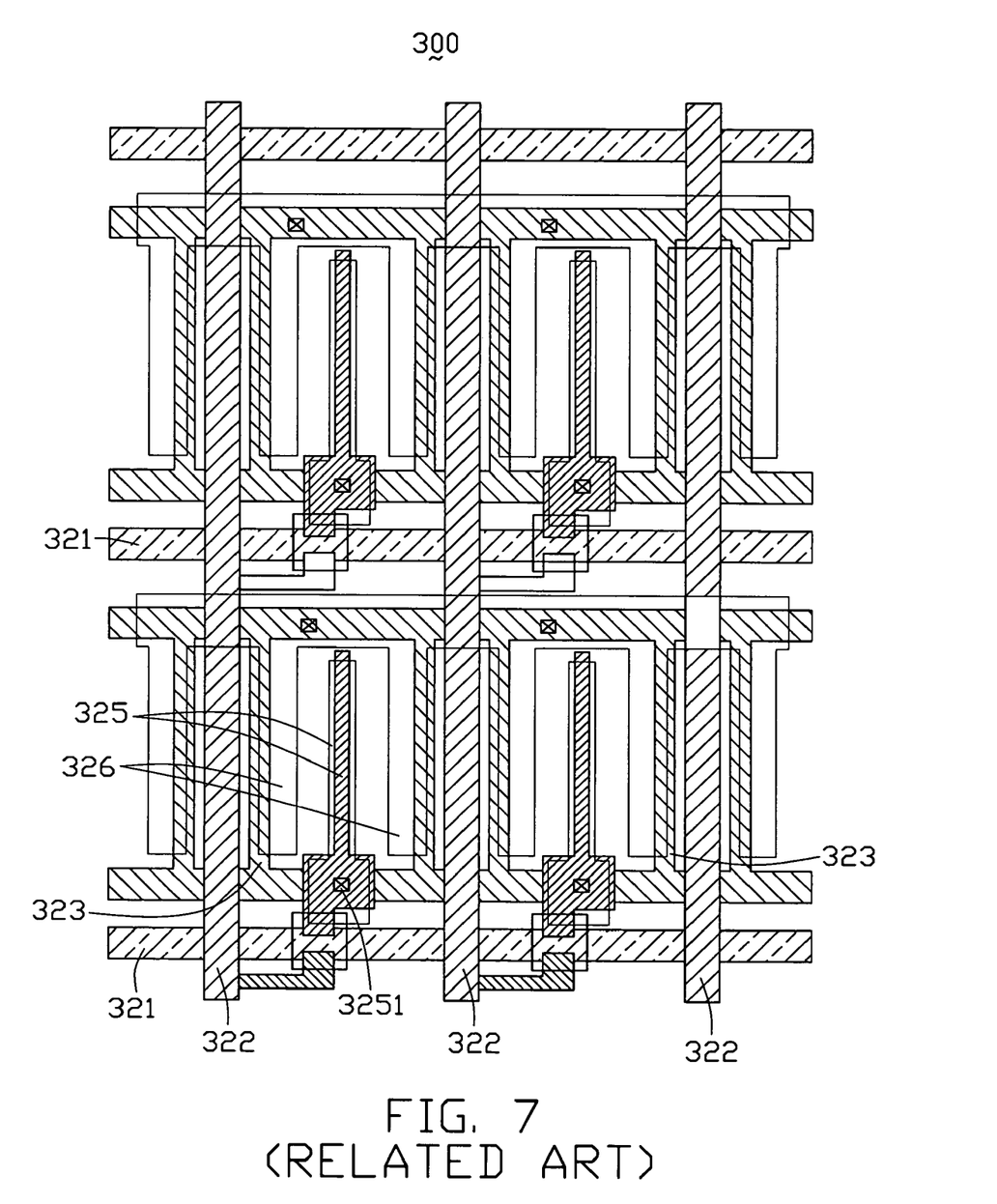
FIG. 7 is a top plan view of certain components of four pixel units of a conventional IPS-LCD.
Figure 8:
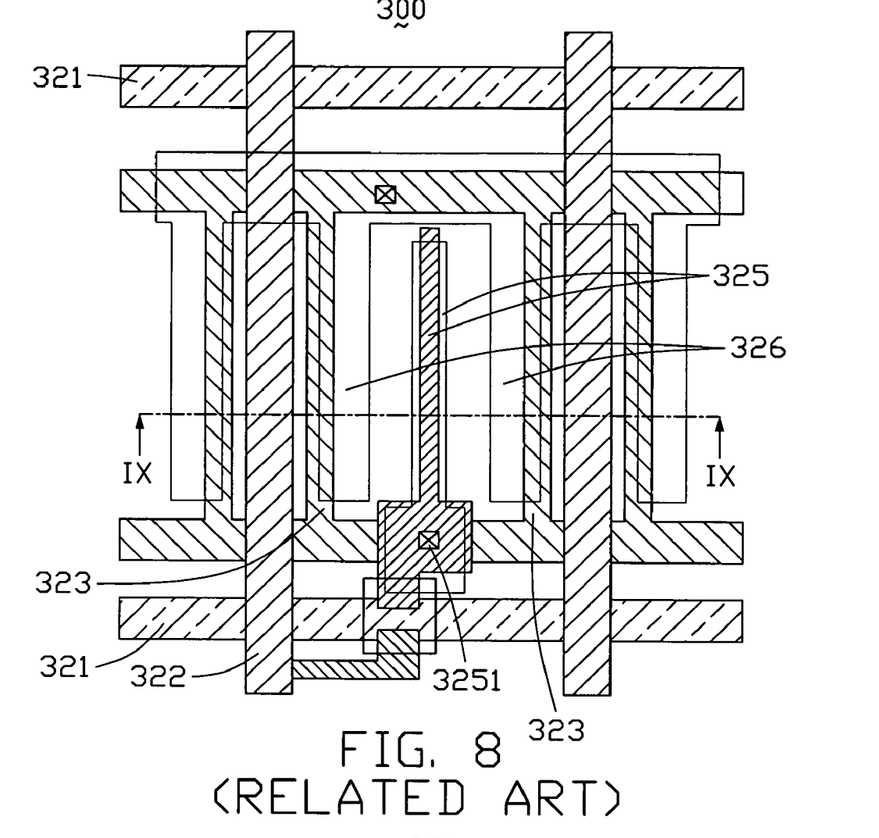
FIG. 8 is an enlarged view of one of the pixel units of FIG. 7.

Referring also to FIGS. 7 and 8, the TFT substrate 320 includes a plurality of gate lines 321 that are parallel to each other and extend along a first direction, and a plurality of source bus lines 322 that are parallel to each other and extend along a second direction orthogonal to the first direction. The gate lines 321 and source bus lines 322 thereby define a plurality of pixel regions (not labeled). In each pixel region, the TFT substrate 320 further includes two overlapping pixel electrodes 325 parallel to the source bus line 322, a pair of shield metal lines 323 located at two opposite sides of the two overlapping pixel electrodes 325, and two common electrodes 326 that are parallel to the pixel electrodes 325 and partly overlap the shield metal lines 323 respectively. One of the common electrodes 326 is positioned between the two overlapping pixel electrodes 325 and the source bus line 322. The other common electrode 326 is positioned between the two overlapping pixel electrodes 325 and an adjacent source bus line 322. The source bus line 322 is made of metal.

In each pixel region, the common electrodes 326 and a top one of the pixel electrodes 325 are in a same layer on the TFT substrate 320, and can be made of transparent material such as indium-tin oxide (ITO). The other bottom pixel electrode 325 is made of metal, and is formed in a different layer from the layer having the common electrodes 326 and the top pixel electrode 325. In particular, an interlaminated insulating film 329 separates the common electrodes 326 and top pixel electrode 325 from the bottom pixel electrode 325. The two overlapping pixel electrodes 325 in different layers are connected by a through-hole 3251.

Generally, the common electrodes 326, the source bus line 322 and the dielectric insulating film 329 therebetween form a plurality of first capacitors $C_1$. The top pixel electrode 325, an adjacent one of the common electrodes 326 and the dielectric insulating film 329 therebetween form a plurality of second capacitors $C_2$.

Figure 10:
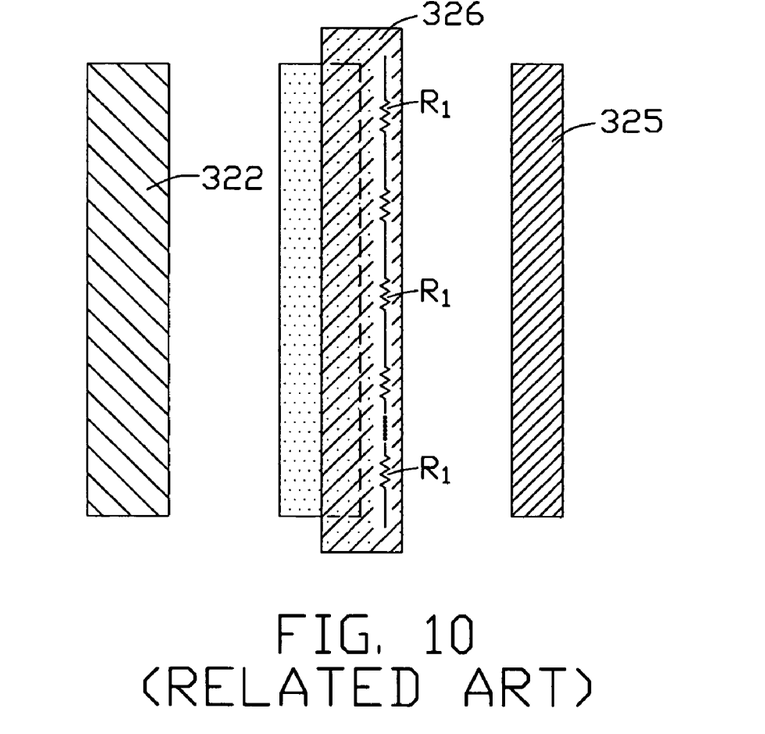
FIG. 10 and FIG. 11 are abbreviated, equivalent circuit diagrams of certain components of the pixel unit of FIG. 8.
Figure 11:
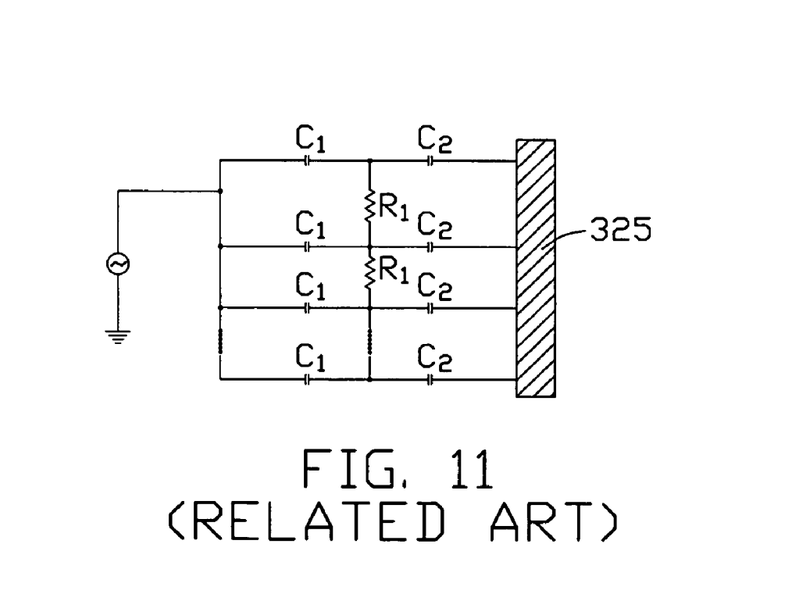

Referring also to FIGS. 10 and 11, because the common electrodes 326 are made of transparent ITO and the source bus line 322 and the shield metal lines 323 are made of metal, a resistance along a given length of each of the common electrodes 326 is about five hundreds times that of the source bus line 322 or each of the shield metal lines 323 along a same given length. Thus, the resistances of the source bus line 322 and the shield metal lines 323 can effectively be ignored with respect to the resistances of the common electrodes 326.

Each of the common electrodes 326 can electrically be considered to be a plurality of resistors $R_1$ joined in series in a column direction (as illustrated), wherein the effective resistance of each resistor $R_1$ is a constant. Each first capacitor $C_1$ and a corresponding second capacitor $C_2$ are joined in series between the source bus line 322 and the top pixel electrode 325 in a row direction (as illustrated). The first capacitor $C_1$ is connected to the source bus line 322, and the second capacitor $C_2$ is connected to the top pixel electrode 325. A connecting node (not labeled) is defined between each first capacitor $C_1$ and the corresponding second capacitor $C_2$. Two ends of each resistor $R_1$ are respectively connected to two corresponding connecting nodes. Because the source bus line 322 is used to provide image signals to the pixel electrode 325 via a switch element (not labeled), the source bus line 322 can be considered to be a signal source.

Operation of the IPS-LCD panel 300 has the following disadvantage. When an external circuit (not shown) provides image signals to the source bus line 322, the image signals may partly leak because of the capacitances of the first and second capacitors $C_1$, $C_2$, in which case the leaked signals may be capacitively coupled to the top pixel electrode 325 via the first and second capacitors $C_1$, $C_2$. Thus considerable crosstalk can occur between the source bus line 322 and the top pixel electrode 325.

It is desired to provide an IPS-LCD panel which overcomes the above-described disadvantage.

SUMMARY

An IPS-LCD panel includes a TFT substrate, a CF substrate facing the TFT substrate, and a liquid crystal layer sandwiched between the two substrates. The TFT substrate includes a plurality of gate lines that are parallel to each other and extend along a first direction, a plurality of source bus lines that are parallel to each other and extend along a second direction different from the first direction to define a plurality of pixel regions. Each of the pixel regions includes a pair of source bus lines, a pixel electrode that is between and parallel to the source bus lines, a pair of shield metal lines located at two opposite sides of the pixel electrode respectively, a pair of common electrodes that are parallel to the pixel electrode and partly overlap the shield metal lines respectively. One of the common electrodes is positioned between the pixel electrode and one of the source bus lines. The other common electrode is positioned between the pixel electrode and the other source bus line. Each of the common electrodes includes a slit therein in order to attenuate any crosstalk between the source bus line and the pixel electrode.

Advantages and novel features of the above-described IPS-LCD panel will become more apparent from the following detailed description when taken in conjunction with the accompanying drawings. In the drawings, all the views are schematic.

DETAILED DESCRIPTION OF PREFERRED EMBODIMENTS

Reference will now be made to the drawings to describe the present invention in detail.

Figure 2:
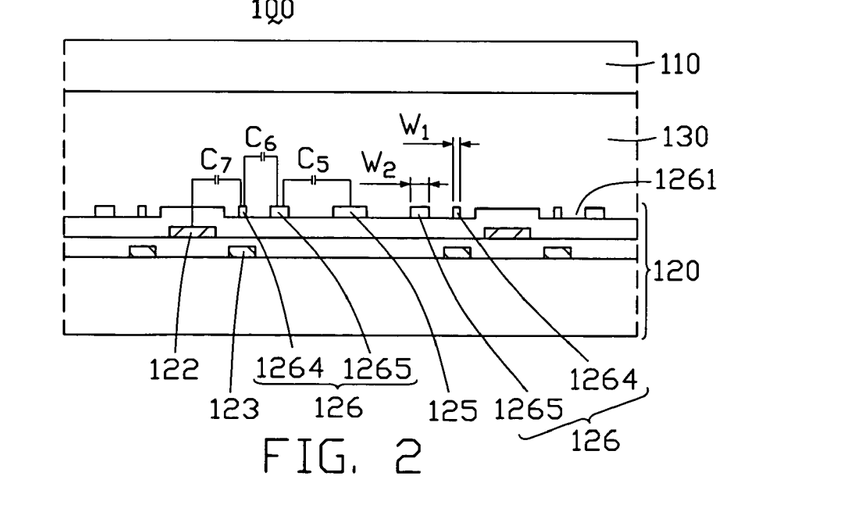
FIG. 2 is a cross-sectional view of a pixel unit of the IPS-LCD according to the first embodiment, corresponding to line II-II of FIG. 1.

Referring to FIG. 2, an IPS-LCD panel 100 according to a first embodiment of the present invention includes a CF substrate 110, a TFT substrate 120 facing the CF substrate 110, and a liquid crystal layer 130 sandwiched between the two substrates 110, 120.

Figure 1:
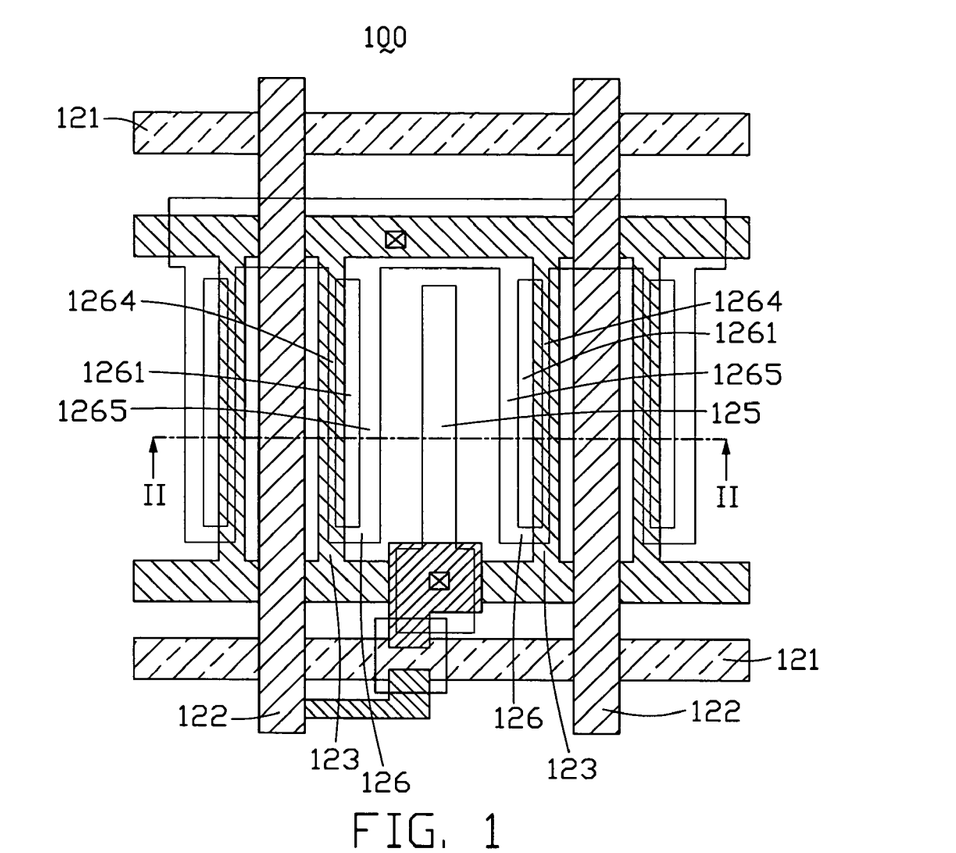
FIG. 1 is a top plan view of certain components of a pixel unit of an IPS-LCD according to a first embodiment of the present invention.

Referring also to FIG. 1, the TFT substrate 120 includes a plurality of gate lines 121 that are parallel to each other and extend along a first direction, and a plurality of source bus lines 122 that are parallel to each other and extend along a second direction orthogonal to the first direction. The gate lines 121 and source bus lines 122 thereby define a plurality of pixel regions (not labeled). In each pixel region, the TFT substrate 120 includes a pair of source bus lines 122, a pixel electrode 125 between and parallel to the source bus lines 122, a pair of shield metal lines 123 located at two opposite sides of the pixel electrode 125 respectively, and a pair of common electrodes 126 that are parallel to the pixel electrode 125 and partly overlap the shield metal lines 123 respectively. One of the common electrodes 126 is positioned between the pixel electrode 125 and one of the source bus lines 122. The other common electrode 126 is positioned between the pixel electrode 125 and the other source bus line 122. The source bus lines 122 are made of metal.

Each of the common electrodes 126 includes a slit 1261 extending along a direction parallel to the corresponding source bus line 122. Thus the common electrode 126 includes a first common electrode strip 1264 and a second common electrode strip 1265 at opposite sides of the slit 1261 respectively. The first common electrode strip 1264 is located closer to the source bus line 122 than the second common electrode strip 1265. A width $W_1$ of the first common electrode strip 1264 is less than a width $W_2$ of the second common electrode strip 1265. Thus, a resistance along a given length of the first common electrode strip 1264 is larger than that of the second common electrode strip 1265 along the same given length.

In each pixel region, the common electrodes 126 and the pixel electrode 125 are in a same layer on the TFT substrate 120, and can be made of transparent material such as indium-tin oxide (ITO). Generally, the first common electrode strip 1264 of each common electrode 126, the corresponding source bus line 122 and a dielectric layer therebetween (not labeled) form a plurality of first capacitors $C_7$. The first common electrode strip 1264, the corresponding second common electrode strip 1265 and the dielectric layer therebetween form a plurality of second capacitors $C_6$. The second common electrode strip 1265, the pixel electrode 125 and the dielectric layer therebetween form a plurality of third capacitors $C_5$.

Figure 3:
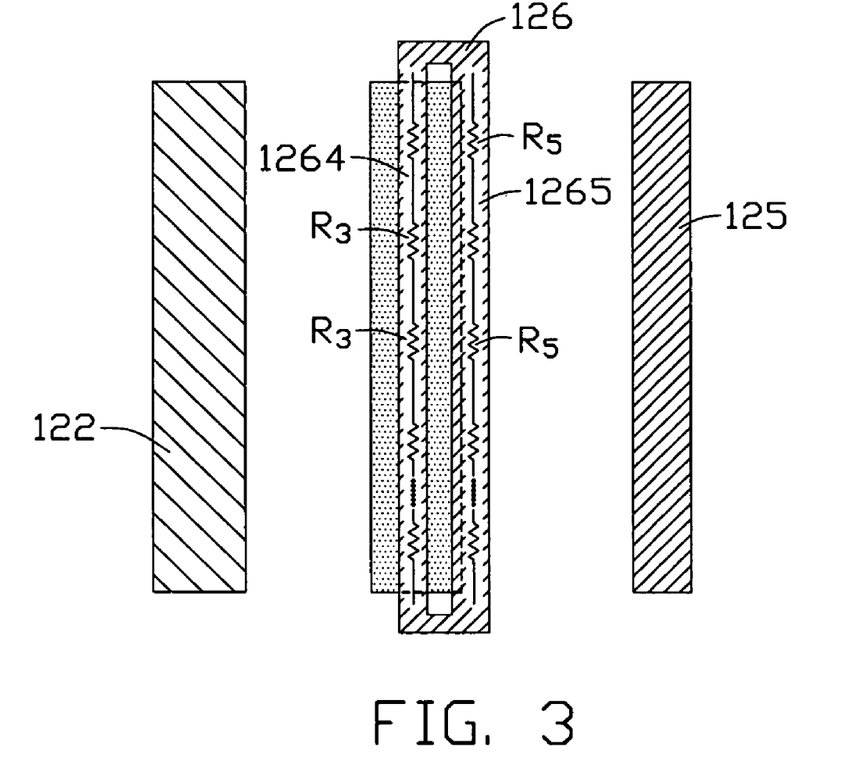
FIG. 3 and FIG. 4 are abbreviated, equivalent circuit diagrams of certain components of the pixel unit of FIG. 1.
Figure 4:
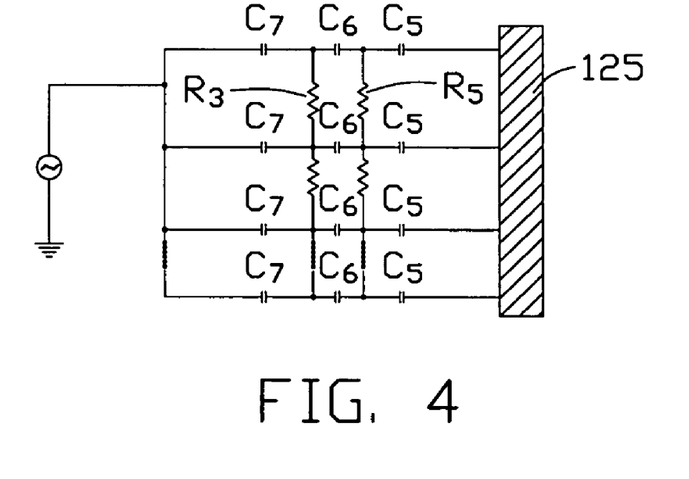

Referring also to FIGS. 3 and 4, because the common electrodes 126 are made of transparent ITO and the source bus lines 122 and the shield metal lines 123 are made of metal, a resistance along a given length of each of the common electrodes 126 is about five hundreds times that of each of the source bus lines 122 or each of the shield metal lines 123 along the same given length. Thus, the resistances of the source bus lines 122 and the shield metal lines 123 can effectively be ignored with respect to the resistances of the common electrodes 126.

In each common electrode 126, the first common electrode strip 1264 can be considered to be a plurality of resistors $R_3$ joined in series in a column direction (as illustrated), wherein the effective resistance of each resistor $R_3$ is a constant "X". The second common electrode strip 1265 can be considered to be a plurality of resistors $R_5$ joined in series in the column direction, wherein the effective resistance of each resistor $R_5$ is a constant "Y". Because the second common electrode strip 1265 is wider than the first common electrode strip 1264, Y<X. Each first capacitor $C_7$, a corresponding second capacitor $C_6$, and a corresponding third capacitor $C_5$ are joined in series between the corresponding source bus line 122 and the pixel electrode 125 in a row direction (as illustrated). The first capacitor $C_7$ is connected to the source bus line 122. The third capacitor $C_5$ is connected to the pixel electrode 125. A first connecting node (not labeled) is defined between each first capacitor $C_7$ and the corresponding second capacitor $C_6$. A second connecting node (not labeled) is defined between each second capacitor $C_6$ and the corresponding third capacitor $C_5$. Two ends of each resistor $R_3$ are respectively connected to two adjacent first connecting nodes. Two ends of each resistor $R_5$ are respectively connected to two adjacent second connecting nodes. Because one of the source bus lines 122 is used to provide image signals to the pixel electrode 125 via a switch element (not labeled), and the other source bus line 122 is used to provide image signals to the pixel electrode 125 of an adjacent pixel via a switch element (not shown), each of the source bus lines 122 can be considered to be a signal source. In sum, the resistors $R_3$, the second capacitors $C_6$ and the resistors $R_5$ constitute an electrical network that functions as a signal attenuator.

Operation of the IPS-LCD panel 100 in respect of each pixel region and one of the source bus lines 122 thereof and components corresponding to that source bus line 122 is as follows. When an external circuit (not shown) provides image signals to the source bus line 122, the image signals may partly leak because of the capacitances of the first capacitors $C_7$, in which case the leaked signals transmit to the first common electrode strip 1264 via the first capacitors $C_7$. Thereupon the leaked signals are significantly attenuated by the electrical network, and transmit to the second common electrode strip 1265. Subsequently, the attenuated image signals may partly leak because of the capacitances of the third capacitors $C_5$, in which case the leaked signals transmit to the pixel electrode 125 via the third capacitors $C_5$.

As described above, each of the common electrodes 126 includes the slit 1261 extending along a direction parallel to the corresponding source bus line 122, whereby the common electrode 126 includes the first common electrode strip 1264 and the second common electrode strip 1265 having the slit 1261 therebetween. The first common electrode strip 1264, the second common electrode strip 1265, and the second capacitors $C_6$ formed therebetween can electrically be considered as equivalent to an electrical network functioning as a signal attenuator. Thus any capacitive coupling of the image signals from the source bus line 122 to the pixel electrode 125 can be significantly attenuated by the electrical network, and crosstalk between the source bus line 122 and the pixel electrode 125 can be correspondingly decreased.

Figure 6:
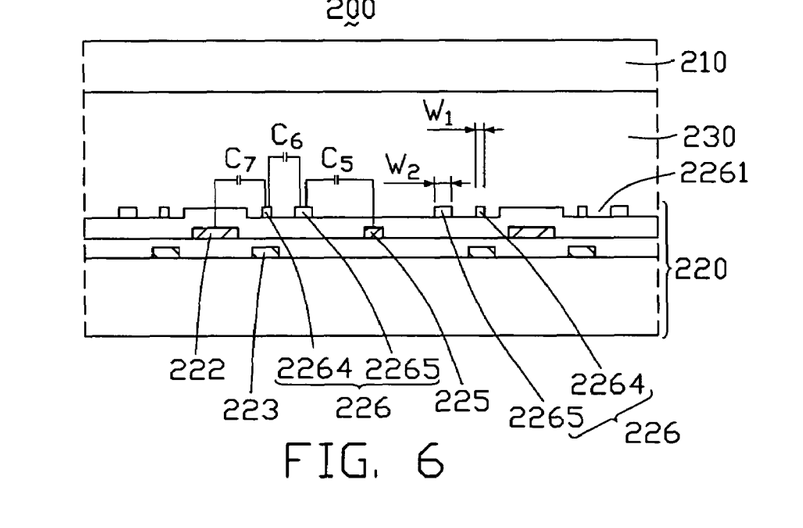
FIG. 6 is a cross-sectional view of a pixel unit of the IPS-LCD according to the second embodiment, corresponding to line VI-VI of FIG. 5.

Referring to FIG. 6, an IPS-LCD panel 200 according to a second embodiment of the present invention includes a CF substrate 210, a TFT substrate 220 facing the CF substrate 210, and a liquid crystal layer 230 sandwiched between the two substrates 210, 220.

Figure 5:
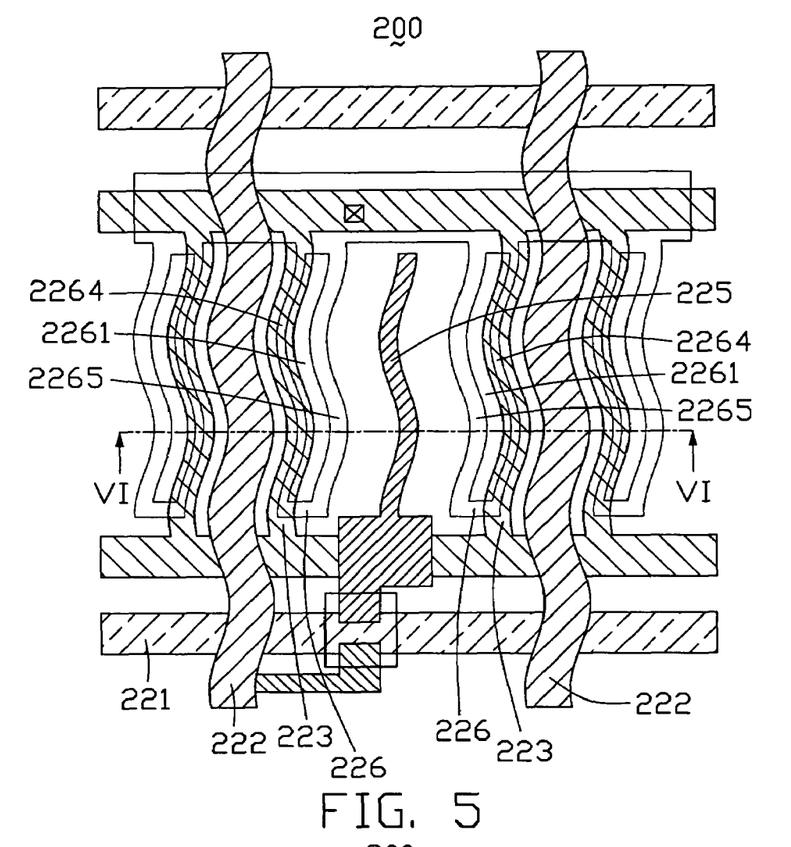
FIG. 5 is a top plan view of certain components of a pixel unit of an IPS-LCD according to a second embodiment of the present invention.

Referring also to FIG. 5, the TFT substrate 220 includes a plurality of gate lines 221 that are parallel to each other and extend generally along a first direction, a plurality of source bus lines 222 that are parallel to each other and extend generally along a second direction orthogonal to the first direction. The gate lines 221 and source bus lines 222 thereby define a plurality of pixel regions (not labeled). In each pixel region, the TFT substrate 220 includes a pair of source bus lines 222, a pixel electrode 225 between and parallel to the source bus lines 222, a pair of shield metal lines 223 located at two opposite sides of the pixel electrode 225 respectively, and a pair of common electrodes 226 that are parallel to the pixel electrode 225 and partly overlap the shield metal lines 223 respectively. One of the common electrodes 226 is positioned between the pixel electrode 225 and one of the source bus lines 222. The other common electrode 226 is positioned between the pixel electrode 225 and the other source bus line 222. The source bus lines 222 and the pixel electrode 225 are made of metal. The common electrodes 226 are made of transparent material such as indium-tin oxide (ITO).

Each of the common electrodes 226 includes a slit 2261 extending generally along a direction parallel to the corresponding source bus line 222. Thus the common electrode 226 includes a first common electrode strip 2264 and a second common electrode strip 2265 at opposite sides of the slit 2261 respectively. The first common electrode strip 2264 is located closer to the source bus line 222 than the second common electrode strip 2265. The source bus lines 222, the shield metal lines 223, the pixel electrode 225, the common electrodes 226, and the slits 2261 all have a same wavy configuration. In alternative embodiments, the source bus lines 222, the shield metal lines 223, the pixel electrode 225, the common electrodes 226, and the slits 2261 can all have a same "S" shaped configuration, or can all have a same gently zigzagged configuration.

A width $W_1$ of each first common electrode strip 2264 is less than a width $W_2$ of the corresponding second common electrode strip 2265. Thus, a resistance along a given length of the first common electrode strip 2264 is larger than that of the second common electrode strip 2265 along the same given length.

In each pixel region, the common electrodes 226 and the pixel electrode 225 are in different layers on the TFT substrate 220. Generally, the first common electrode strip 2264 of each common electrode 226, the corresponding source bus line 222 and a dielectric layer therebetween (not labeled) form a plurality of first capacitors $C_7$. The first common electrode strip 2264, the corresponding second common electrode strip 2265 and the dielectric layer therebetween form a plurality of second capacitors $C_6$. The second common electrode strip 2265, the pixel electrode 225 and the dielectric layer therebetween form a plurality of third capacitors $C_5$.

In each common electrode 226, the first common electrode strip 2264, the second common electrode strip 2265 and the second capacitors $C_6$ formed therebetween can electrically be considered as equivalent to an electrical network functioning as a signal attenuator. Operation of the IPS-LCD panel 200 is similar to the above-described operation of the IPS-LCD panel 100. Any capacitive coupling of image signals from each of the source bus lines 222 to the pixel electrode 225 can be significantly attenuated by the electrical network, and crosstalk between the source bus line 222 and the pixel electrode 225 can be correspondingly decreased.

Those skilled in the art will readily appreciate that numerous modifications and alterations of the above-described IPS-LCD panels may be made without departing from the scope of the principles of the present invention. Accordingly, the above disclosure should be construed as limited only by the metes and bounds of the appended claims or equivalents thereof.

What is claimed is:

1. An in-plane switching mode liquid crystal display (IPS-LCD) panel, comprising:
    a thin film transistor (TFT) substrate comprising:
    a plurality of gate lines that are parallel to each other and extend along a first direction;
    a plurality of source bus lines that are parallel to each other and extend along a second direction different from the first direction, the source bus lines crossing the gate lines to define a plurality of pixel regions, each of the pixel regions comprising:
        a pair of source bus lines;
        a pixel electrode that is between and parallel to the source bus lines;
        a pair of shield metal lines positioned at two opposite sides of the pixel electrode respectively; and
        a pair of common electrodes that are parallel to the pixel electrode and partly overlap the shield metal lines respectively, one of the common electrodes being positioned between the pixel electrode and one of the source bus lines, the other common electrode being positioned between the pixel electrode and the other source bus line, each of the common electrodes comprising a slit parallel with the corresponding source bus line and between the source bus line and the pixel electrode in order to attenuate any crosstalk between the source bus line and the pixel electrode, each of the common electrodes further comprising a first common electrode strip and a second common electrode strip at opposite sides of the slit respectively, the first common electrode strip being closer to the corresponding source bus line than the second common electrode strip;
    a color filter substrate facing the TFT substrate; and
    a liquid crystal layer sandwiched between the two substrates.

2. The IPS-LCD panel as claimed in claim 1, wherein a width of the first common electrode strip is less than that of the second common electrode strip.

3. The IPS-LCD panel as claimed in claim 2, wherein a resistance of the first common electrode strip along a given length is larger than that of the second common electrode strip along the same given length.

* * * * *

UNITED STATES PATENT AND TRADEMARK OFFICE
CERTIFICATE OF CORRECTION

PATENT NO. : 7,636,143 B2
APPLICATION NO. : 11/511142
DATED : December 22, 2009
INVENTOR(S) : Chen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 470 days.

Signed and Sealed this

Ninth Day of November, 2010

David J. Kappos
*Director of the United States Patent and Trademark Office*